(12) United States Patent
Garcia et al.

(10) Patent No.: US 7,688,970 B2
(45) Date of Patent: Mar. 30, 2010

(54) INTERCONNECT ASSEMBLY FOR A CLAM STYLE PORTABLE COMMUNICATION DEVICE

(75) Inventors: Jorge L. Garcia, Plantation, FL (US); Christopher D. Crawford, Tamarac, FL (US)

(73) Assignee: Motorola, Inc., Schaumburg, IL (US)

( * ) Notice: Subject to any disclaimer, the term of this patent is extended or adjusted under 35 U.S.C. 154(b) by 865 days.

(21) Appl. No.: 10/944,527

(22) Filed: Sep. 17, 2004

(65) Prior Publication Data

US 2006/0063572 A1  Mar. 23, 2006

(51) Int. Cl.
*H04M 1/00* (2006.01)

(52) U.S. Cl. .............................. 379/433.05; 379/443.13; 379/433.1; 455/575.3

(58) Field of Classification Search .............. 455/575.1, 455/575.2, 575.3, 575.4, 575.8, 566, 165, 455/271, 64; 379/433.05, 443.13, 433.1
See application file for complete search history.

(56) References Cited

U.S. PATENT DOCUMENTS

| 5,363,089 | A  | * | 11/1994 | Goldenberg | ............... 340/7.63 |
| 6,700,784 | B2 |   | 3/2004  | Huang et al. | |
| 6,844,845 | B1 | * | 1/2005  | Whiteside et al. | ........ 342/357.1 |
| 6,872,088 | B2 | * | 3/2005  | Watanabe | .................... 439/165 |
| 7,142,898 | B2 | * | 11/2006 | Takagi | ...................... 455/575.3 |
| 2003/0063041 | A1 | * | 4/2003 | Kurashima et al. | ........... 345/1.1 |
| 2003/0118179 | A1 |   | 6/2003 | Barnett et al. | |
| 2003/0211873 | A1 | * | 11/2003 | Komiyama | ............... 455/575.3 |
| 2004/0198417 | A1 | * | 10/2004 | Yoda | ....................... 455/550.1 |
| 2004/0212956 | A1 | * | 10/2004 | Kuivas et al. | ............... 361/683 |
| 2005/0239520 | A1 | * | 10/2005 | Stefansen | ................ 455/575.1 |
| 2005/0282599 | A1 |   | 12/2005 | Hehn | |
| 2006/0040712 | A1 | * | 2/2006 | Ansari et al. | ................. 455/566 |

OTHER PUBLICATIONS

PCT/US2005/031002—International Preliminary Report on Patentability and Written Opinion mailed Mar. 29, 2007—6 pages.

* cited by examiner

*Primary Examiner*—Patrick N Edouard
*Assistant Examiner*—Julio Perez
(74) *Attorney, Agent, or Firm*—Barbara R. Doutre

(57) ABSTRACT

An interconnect assembly for a clam style portable communication device (100) provides for a hermetically sealed device that prevents water intrusion. A flex (106) electrically interconnects a flip compartment (102) to a main radio compartment (104). First and second seals (112, 114) coupled to the ends (108, 110) of the flex (106) provide independent sealing of the flip compartment (102) from the main radio compartment (104). Thus, the flex (106) provides both electrical interconnect and independent mechanical sealing of the two compartments (102, 104).

16 Claims, 4 Drawing Sheets

INTERCONNECT ASSEMBLY FOR A CLAM STYLE PORTABLE COMMUNICATION DEVICE

TECHNICAL FIELD

This invention relates in general to portable communication devices and more particularly to hinge assemblies for clam style communication devices.

BACKGROUND

Portable communication devices, such as two-way radios and cell phones, are used in a variety of markets. Cell phones typically address the needs of the consumer market while two-way radios are most often used in the public safety arena, such a police and fire rescue. As such, the physical requirements differ depending on the intended application for the product. A variety of form factors are used in both consumer and commercial communication devices, but the clam style phone, sometimes referred to as the flip style, has heretofore been used primarily in the consumer market. The clam style phone usually consists of two compartments, a main radio compartment and a flip compartment, coupled together via a hinge. The hinge typically includes a flex for interconnecting the electronics of the two compartments.

There is an ever increasing desire to have consumer type communication products meet higher standards of physical requirements and likewise to have commercial type products appear in consumer type form factors. Clam style phones, have traditionally been unsealed, thereby allowing for possible water intrusion. As clam style phones gain in popularity in the commercial arena, the need for a sealed design becomes apparent. The hinge is the most challenging element when designing a sealed clam style communication device.

Accordingly, there is a need for an improved interconnect assembly for use in a clam style portable communication device to provide a sealed environment that prevents water intrusion.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
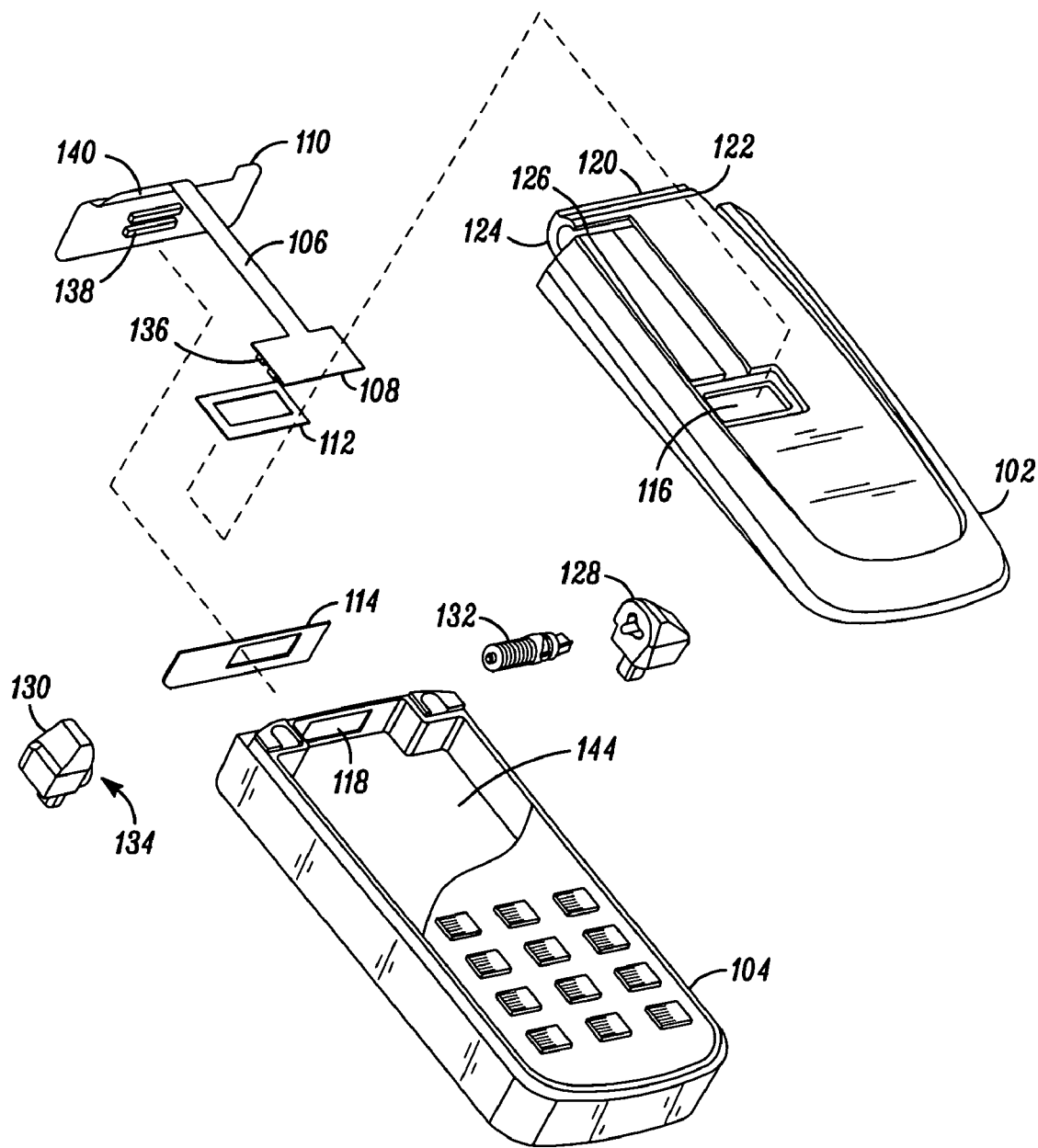
FIG. 1 is an exploded view of a portable communication device in accordance with the present invention.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein an interconnect assembly for a clam style communication device. By utilizing a flex to electronically couple and independently seal both a main radio compartment and a flip compartment of the device, an unsealed hinge can now be used to mechanically interconnect the two compartments. Each compartment is independently sealed from the other through the use of seals coupled to the ends of the interconnect flex.

FIG. 1 is an exploded view of a communication device in accordance with the present invention. Communication device 100 is a clam style device having first and second compartments 102, 104 respectively. In accordance with the present invention, a flex 106 having first and second ends 108, 110 electrically interconnects the first compartment 102 to the second compartment 104 and seals the first compartment independently from the second compartment. A hinge assembly 142 (shown assembled in FIG. 4B) mechanically couples the first compartment 102 to the second compartment 104 and provides a path through which the flex 106 gets guided.

In accordance with the present invention, first and second seals 112, 114 are coupled to the first and second ends 108, 110 of the flex 106, the first seal for sealing the first compartment 102 and the second seal for sealing the second compartment 104. The first compartment 102 includes a first recessed opening 116, and the second compartment 104 includes a second recessed opening 118. Electronic contacts 136 are located on the first end 108 of the flex 106 and are interconnected to electronic contacts 138 located on the second end 110 of the flex. The first and second ends 108, 110 of the flex 106 align within and couple to the recessed openings 116, 118 via the first and second seals 112, 114 respectively. Independent perimeter seals are thus formed around each set of contacts 136, 138. The seals 112, 114 prevent fluid intrusion into the compartments 102, 104.

Hinge assembly 142 mechanically couples the first compartment 102 to the second compartment 104. In accordance with a preferred embodiment of the invention, hinge assembly 142 includes a barrel 120 having first and second ends 122, 124 and a slot 126 formed therein. The slot 126 is used to guide the flex 106 from the first compartment 102 through the barrel 120. Hinge assembly 142 further includes first and second knuckles 128, 130 respectively, the first knuckle 128 for coupling to the first end 122 of the barrel 120, and the second knuckle for coupling to the second end 124 of the barrel. A cam spring 132 gets coupled to the first knuckle 128 within the barrel 120. The second knuckle 130 includes an aperture 134 through which to guide the flex 106 from the slot 126 to the second compartment 104. Flex 106 preferably includes a service loop portion 140 to provide leeway to accommodate the pivot motion created when the clam style communication device opens and closes.

While hinge assembly 142 has been described in terms of a preferred embodiment, other hinge configurations may also be used without departing from the scope of the interconnect assembly of the present invention. For example, barrel 120 is shown integrated as part of the first compartment 102, however this barrel can also be integrated as part of the second compartment 104 or even formed as an independent component. While the second end 110 of the flex 106 and corresponding seal 114 are shown aligned with a recessed opening 118 located on a side wall of the communication device 100, however this recessed opening 118 could also be formed in a bottom surface 144 of the second compartment 104. In this configuration, the flex 106 would wrap around to surface 144 in order to accommodate the different interconnect.

Figure 2:
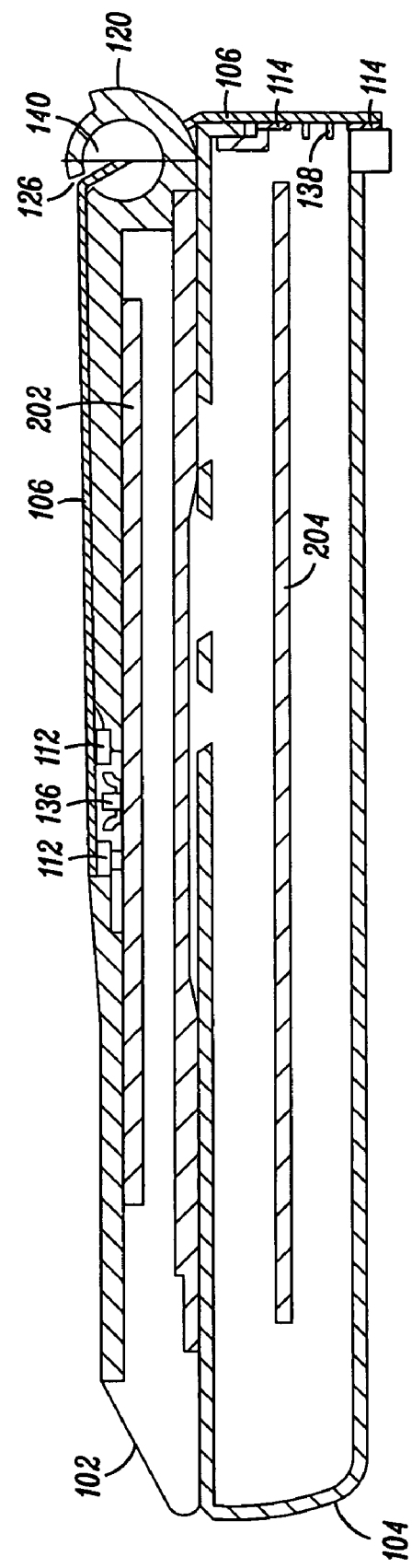
FIG. 2 is a cross-sectional view the portable communication device in accordance with the present invention.

FIG. 2 is a cross-sectional view of the portable communication device in accordance with the present invention. The first seal 112 is coupled to the first end of the flex 106, and the second seal 114 is coupled to the second end of the flex. In accordance with the present invention, the first and second seals 112, 114 seal the first and second ends of the flex 106 to the first and second compartments 102, 104 respectively, thereby providing the independent sealing of the two compartments. The first and second compartments 102, 104 each have electronic circuitry enclosed therein represented by printed circuit boards (PCBs) 202, 204 respectively. The first and second ends of the flex 106 show the electrical contacts 136, 138 disposed thereon that electrically couple the first and second compartments 102, 104.

Since both compartments are sealed independently from each other, an unsealed hinge can be used to mechanically couple the two compartments. In the view of FIG. 2, the service loop portion 140 of the flex 106 can be seen guided through the barrel 120 via slot 126.

Figure 3:
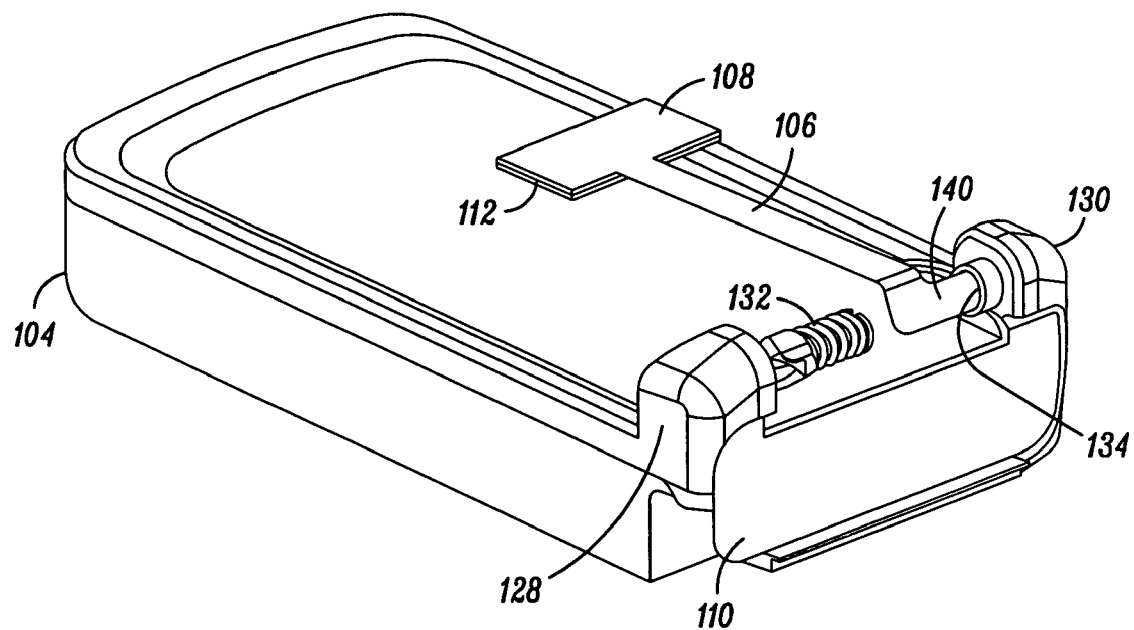
FIG. 3 is a partially assembled view of the portable communication device in accordance with the present invention.

FIG. 3 is a partially assembled view of the communication device of the present invention. This view shows the second compartment 104, flex 106 and part of the hinge assembly (minus the barrel 120). Service loop 140 of flex 106 is guided through aperture 134 of second knuckle 130. Cam spring 132 is coupled to first knuckle 128. Service loop 140 and cam spring 132 provide the pivot function for the clam style communication device. The first seal 112 can be seen coupled to the first end 108 of the flex 106. Seal 114 (not seen in this view) couples the second end 110 of flex 106 to the second compartment 104. Sealing of the flex 106 to the compartments 102, 104 can be accomplished via an adhesive seal, a compressible seal or some combination thereof. In accordance with the present invention, the single flex 106 having separate seals 112, 114 at either end 108, 110 provides independent sealing of one compartment of a clam style communication device from the other, thereby allowing for an unsealed hinge to be coupled therebetween.

Figures 4A, 4B:
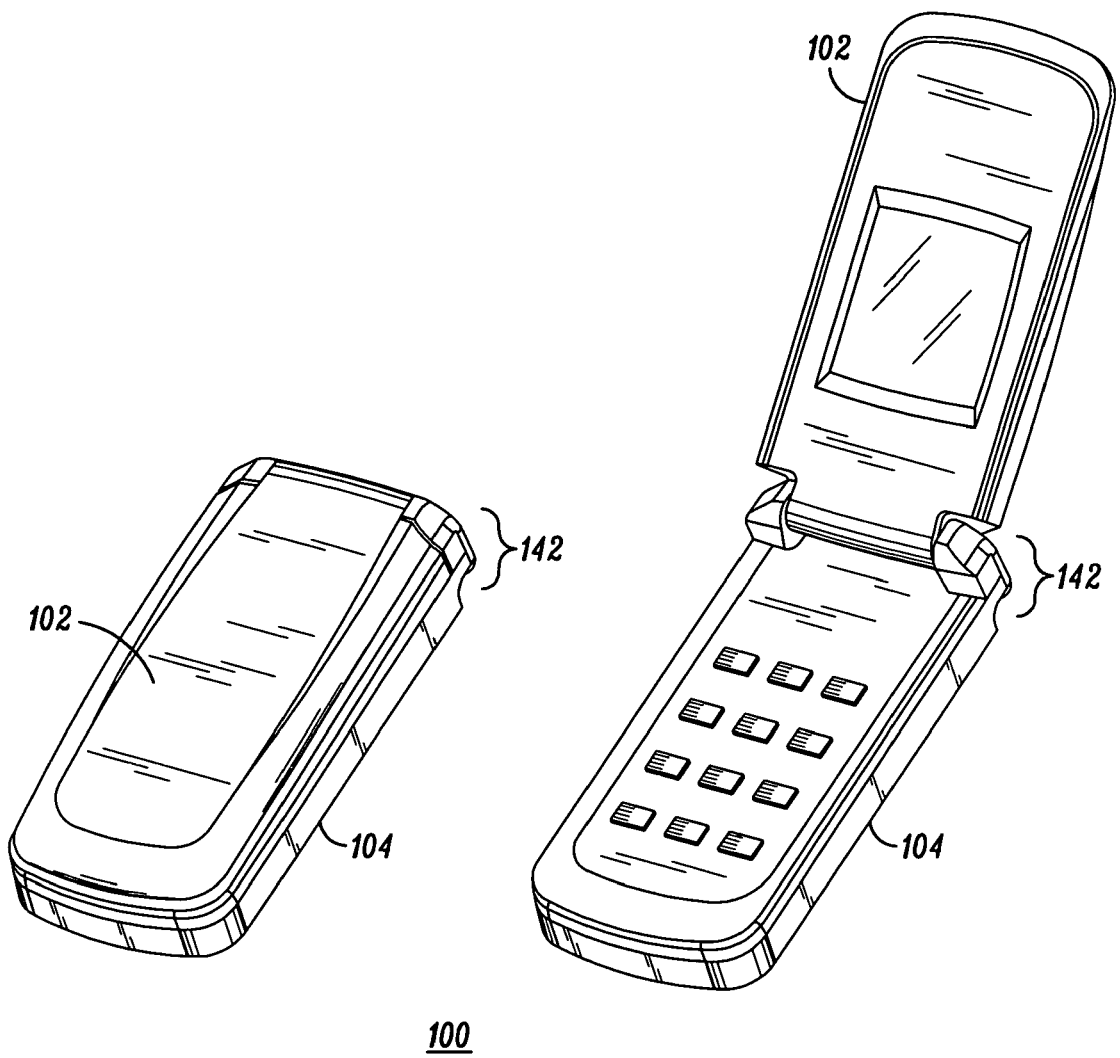
FIG. 4A and FIG. 4B are open and closed views of the portable communication device formed in accordance with the present invention.

FIGS. 4A and 4B show the clam style portable communication device 100 of the present invention in closed and open positions respectively. First compartment 102 is shown as the flip compartment and second compartment 104 provides the main radio compartment. Communication device 100 may be a cell phone, two-way radio or combination simplex and duplex communication device. The flip portion may include display circuitry, audio circuitry and/or other functionality. The main radio compartment includes transceiver circuitry. The electronic circuitry of the two compartments is electrically coupled through a flex formed in accordance the present invention. The hinge assembly 142 provides the mechanical interconnect while the flex provides both electrical interconnect and independent sealing of the two compartments. The advantages of the interconnect assembly of the present invention include the ability to use an unsealed hinge and yet still provide a hermetically sealed device that protects against water intrusion to the sealed compartments 102, 104.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An interconnect assembly for a clam style portable communication device, comprising:
    first and second compartments having electronic circuitry enclosed therein;
    a hinge mechanically coupling the first and second compartments;
    an external flex having first and second ends with electrical contacts disposed thereon, the external flex electrically coupling the first and second compartments, the external flex being guided through the hinge;
    a first seal coupled to the first end of the external flex;
    a second seal coupled to the second end of the external flex; and
    the first and second seals sealing the electronic circuitry of the first and second compartments respectively.

2. The interconnect assembly of claim 1, wherein the clam style portable communication device is a cell phone.

3. The interconnect assembly of claim 1, wherein the clam style portable communication device is a two-way radio.

4. The interconnect assembly of claim 1, wherein the clam style portable communication device is a combination simplex and duplex communication device.

5. The interconnect assembly of claim 1, wherein the first and second seals comprises adhesive seals.

6. The interconnect assembly of claim 1, wherein the first and second seals comprise compressible seals.

7. The interconnect assembly of claim 1, wherein the hinge is unsealed.

8. The interconnect assembly of claim 1, wherein the external flex provides a water seal to both the first compartment and the second compartment independently of each other.

9. The interconnect assembly of claim 1, wherein the first and second seals seal the first and second compartments respectively thereby preventing fluid intrusion from reaching the electronic circuitry.

10. A communication device, comprising:
    a first compartment having a first recessed opening;
    a second compartment having a second recessed opening;
    a hinge assembly coupling the first compartment to the second compartment;
    an external flex having first and second ends electrically coupling the first and second compartments; and
    first and second seals coupled to the first and second ends of the external flex respectively, the seals also being coupled to the first and second recessed openings of the first and second compartments respectively.

11. The communication device of claim 10, wherein the hinge assembly comprises:
    a barrel having first and second ends and a slot formed therein, the slot for guiding the external flex from the first compartment through the barrel;
    a first knuckle coupled to the first end of the barrel;
    a cam spring within the barrel and coupled to the first knuckle;
    a second knuckle coupled to the second end of the barrel, the second knuckle including an aperture through which to guide the external flex from the slot to the second compartment.

12. The communication device of claim 10, wherein the first compartment comprises a flip compartment, and the second compartment comprises a main radio compartment.

13. The communication device of claim 12, wherein the barrel is integrated as part of the flip compartment.

14. The communication device of claim 10, wherein the first compartment comprises a main radio compartment, and the second compartment comprises a flip compartment.

15. The communication device of claim 14, wherein the barrel is integrated as part of the main radio compartment.

16. The communication device of claim 10, wherein the seals coupled to the first and second recessed openings prevent fluid intrusion into the first and second electrically coupled compartments.

* * * * *